C. G. DE LAVAL AND R. HEIMBECKER.
COMPOUND METER.
APPLICATION FILED MAY 14, 1915. RENEWED DEC. 27, 1917.

1,319,380.

Patented Oct. 21, 1919.

Inventors:
Carl George de Laval and
Roland Heimbecker
By Philipp Sawyer Rice & Kennedy
Attorneys

UNITED STATES PATENT OFFICE.

CARL GEORGE DE LAVAL, OF EAST ORANGE, NEW JERSEY, AND ROLAND HEIMBECKER, OF NEW YORK, N. Y., ASSIGNORS TO HENRY R. WORTHINGTON, A CORPORATION OF NEW JERSEY.

COMPOUND METER.

1,319,380.     Specification of Letters Patent.     Patented Oct. 21, 1919.

Application filed May 14, 1915, Serial No. 27,993. Renewed December 27, 1917. Serial No. 209,155.

*To all whom it may concern:*

Be it known that we, CARL GEORGE DE LAVAL, a citizen of the United States, residing at East Orange, county of Essex, and State of New Jersey, and ROLAND HEIMBECKER, a citizen of the United States, residing at city of New York, in the county of New York and State of New York, have invented new and useful Improvements in Compound Meters, fully described and represented in the following specification and the accompanying drawings, forming a part of the same.

The object of the invention is to provide a simple and efficient meter of the compound type, that is, provided with two metering devices, one for small flows or low duty, and the other for relatively large flows or high duty, with valve mechanism operated by fluid pressure to change the flow from one to the other of the metering devices.

Among the special objects of the invention are to provide a construction by which the metering of the fluid that passes during the action of the change-valve mechanism shall be assured, and to avoid shock on the movement of the change-valve on increase of pressure.

For a full understanding of the invention a detailed description of a construction embodying the same in its preferred form will now be given in connection with the accompanying drawing forming a part of this specification, and the features forming the invention then specifically pointed out in the claims.

Figure 1:
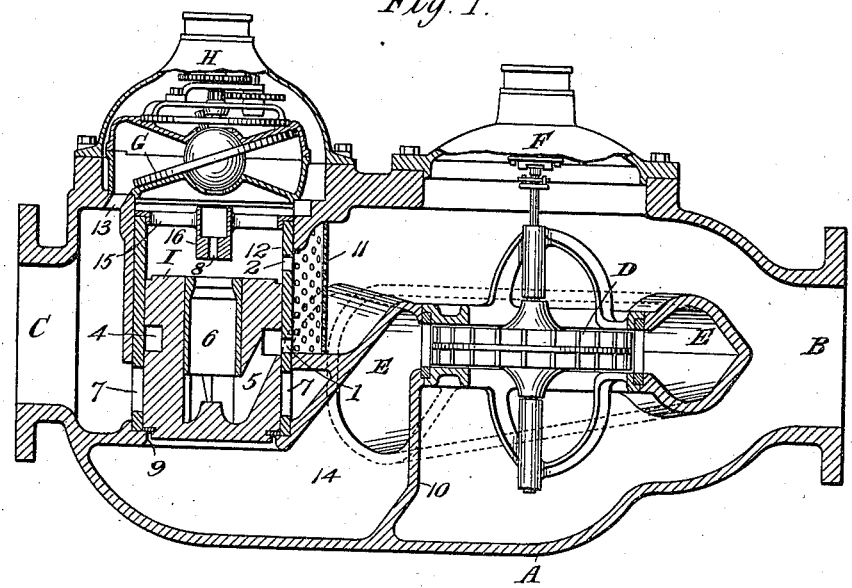
Figure 1 is a central section through the compound meter showing the parts in normal low duty position.

Referring to the drawing, A is the meter casing having inlet B and outlet C. The high duty meter is shown as a turbine meter D of substantially the same construction as shown in United States patent to Sims, No. 1,133,408, dated March 30th, 1915, this turbine meter having the delivery volute E and registering mechanism F. The turbine meter D is shown as in the path of the fluid entering inlet B, the water from the inlet passing from the inlet above and below the turbine wheel, and the flow below the wheel being stopped and directed upward through the turbine wheel by partition 10, while the chamber above the turbine wheel is open to the low duty meter. The low duty meter G is shown as a disk meter of common type having the usual registering mechanism H, this disk meter receiving the fluid from the passage above the turbine meter D through screen 11, cylinder 12, and under the control of change-valve I, and the fluid passing from the disk meter G to the outlet C through port 13.

Referring now to the change-valve mechanism, the change-valve I is a piston valve moving in the cylinder 12, shown as a separate cylinder within the casing wall, and preferably being of heavy bronze to avoid distortion, the fluid from the turbine meter D passing through volute E and passage 14 to the under open side of the cylinder 12 and bottom of the valve I, so that substantially the full area of the valve I is exposed to the fluid pressure, and the valve I being properly weighted to secure the action desired. The cylinder 12 has ports 1, 2 in its side walls through which the fluid passes to the low duty meter in normal low duty operation, port 1 communicating with annular passage 4 extending around the change-valve I and from this passage through side passage 5 and central passage 6 in the change-valve to the cylinder 12 above valve I, and thence through spider 15 on the top of the cylinder to the disk meter. The fluid passes through port 2 directly to the cylinder above the change-valve I and thus to the disk meter. The cylinder 12, also, has ports 7 closed by the valve I in low duty operation, and connecting the cylinder and passage 14 with the outlet C on high duty operation, these ports being of the full capacity of the meter pipe. The port 2 is used to secure the lap of the flows to the two meters on shifting from one meter to the other, as hereafter described, and obviously is not required if the change of meter is to be made without this lap of the flows. The spider 15 not only forms a stop for the valve I in its extreme upper or high duty position, but also carries central plunger 16, in line with the central passage 6 of the change-valve, this plunger having a small port 8 forming an outlet for the fluid in the change-valve when the plunger 16 enters the upper end of passage 6 in the upward movement of the valve I, as hereafter described. The change-valve I in its lowermost position seats upon a shoulder 9 formed on the casing, which shoulder also forms a support for the removable cylinder 12, a seating gasket preferably being set into a slot in the valve as shown.

Figure 2:
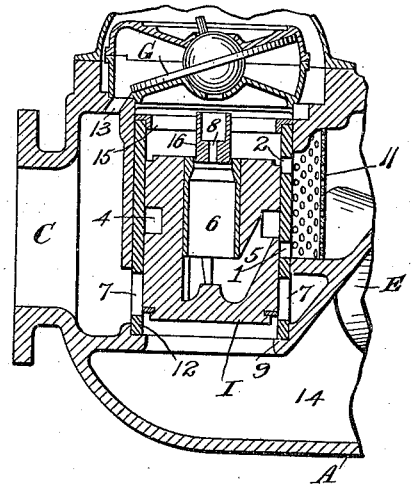
Fig. 2 is a similar partial view showing an intermediate position of the change-valve in shifting from low duty to high duty or vice versa.

The operation of the construction illustrated and above described is as follows:

In the normal operation of the construction, in metering small flows or on low duty, the fluid passes from the inlet B through and over high duty meter D, without operating the latter, to ports 1, 2, and through the change-valve and cylinder 12 to the low duty meter G, and through port 13 to outlet C, such small flow being registered by the low duty meter G. When the flow and pressure of the fluid increase sufficiently so that the pressure on the bottom of valve I raises the latter, the valve I in moving upward first closes port 1 and at the same time opens ports 7, port 1 thus being closed when the ports 7 are only partially open or just beginning to open, but the port 2 remaining open after port 1 is closed, so that the flow to the low duty meter G takes place through port 2 after ports 7 are partially open and operating flow through the high duty meter D secured. On the closing of port 1, and before ports 7 are fully open, the upper end of central passage 6 in change-valve I passes over piston 16, thus closing this passage 6 and preventing the escape of fluid therefrom except through small port 8. This movement of the change valve passing over piston 16 throttles the flow and acts as a dash pot which retards the further upward movement of the valve I and secures an easy slow upward movement until the valve is stopped by spider 15. The position of the parts, with the change-valve partially shifted to close port 1 and commencing to open ports 7, and with the dash pot just coming into action and the port 2 still open, is shown in Fig. 2.

The high duty meter D, with its registering mechanism F, is just starting action, and low duty meter G with its registering mechanism H, is still being operated by the flow through port 2.

In the further upward movement of the change-valve I, the high duty ports 7 are fully opened, and the port 2 closed, this port 2, however, remaining open until the high duty meter is in full operation. When the flow and pressure are reduced, so that the pressure is not sufficient to hold the valve I raised, the valve I falls by its weight, and in its falling movement opens port 2 before ports 7 are closed, as shown in Fig. 2, so that the low duty meter G is in operation with high duty meter D for a time, and then the valve I fully closes the high duty ports 7 and stops the high duty meter D, at the same time opening port 1 for full flow to the low duty meter, as shown in Fig. 1. While the construction shown and described embodies a change valve mechanism which provides lap of the flows on both changes, namely, from low duty to high duty, and vice versa, and such an arrangement forms a specific feature of the invention, it will be understood that the broader features of the invention, as defined by the claims, are not so limited, but may be embodied in constructions in which such lap of the flows does not occur. By this arrangement of the port 2 in relation to the change-valve, there is no failure of registration during shifting from low duty to high duty registration, and vice versa.

The high duty meter has been shown as on the inlet side of the low duty meter. It is desirable in some cases, however, that the high duty meter should be placed on the outlet side of the low duty meter, and it will be understood that the invention is not to be limited to the arrangement shown. It will be understood, also, that other modifications may be made in the detailed construction and arrangement of the parts shown, while retaining the invention defined by the claims.

What is claimed is—

1. The combination with a low duty meter for registering small flows and a high duty meter for registering large flows, of a pressure controlled valve mechanism having a high duty port and a plurality of low duty ports, said valve mechanism being arranged to partially close a portion of the low duty ports on partial opening of the high duty port and to close the remaining portion of the low duty ports when the high duty meter is in full operation, on the change from low duty to high duty operation, and to open a portion of the low duty ports for operation of the low duty meter before the high duty meter is stopped, on the change from high duty to low duty operation.

2. The combination with meters for registering large and small flows, of change valve mechanism comprising a cylinder and a piston valve therein controlled by pressure and operating to change the flow from one meter to the other, said cylinder having ports controlled by said piston valve and arranged to continue the low duty meter in operation after the high duty meter is brought into operation and then to stop the low duty meter on the change from low duty to high duty, and to bring the low duty meter into operation before the high duty meter is stopped on the change from high duty to low duty, and a dash pot acting to retard the piston valve and prevent shock on shifting from low duty to high duty operation.

3. In a change-valve mechanism for compound meters, a cylinder having a plurality of low duty ports and a high duty port, a piston valve in said cylinder controlled by the fluid pressure, there being an annular passage in said piston valve connected with one of said low duty ports, a central passage in said piston valve, and a side passage connecting said annular and central passages, a spider carried by said cylinder for limiting the upward movement of said piston valve, and a central plunger carried by said spider arranged to enter said central passage and forming with the central passage a dash pot acting to retard the piston valve and prevent shock on shifting the valve for change from low duty to high duty operation.

4. The combination with a low duty meter for registering small flows and a high duty meter for registering large flows, of a pressure controlled valve mechanism comprising a cylinder having a high duty port and a plurality of low duty ports and a piston valve movable within said cylinder and arranged to partially close a portion of the low duty ports on partial opening of the high duty port and to close the remaining portion of the low duty ports when the high duty meter is in full operation on change from low duty to high duty operation, and to open a portion of the low duty ports for operation of the low duty meter before the high duty meter is stopped, on change from high duty to low duty operation, and a dash pot acting to retard the piston valve before all the low duty ports are closed on shifting from low duty to high duty registration.

5. In a change-valve mechanism for compound meters, a cylinder having a plurality of low duty ports and a high duty port, a piston valve controlling said ports and controlled by fluid pressure, and a dash pot acting to retard the piston valve before all the low duty ports are closed on shifting from low duty to high duty registration.

6. In a change-valve mechanism for compound meters, cylinder 12 having low duty ports 1 and 2 and high duty port 7, piston valve I controlling said ports and controlled by fluid pressure, there being an annular passage 4 in said piston valve controlling low duty port 1, a central passage 6 in said piston valve open at its upper end and a side passage 5 connecting said annular and central passages.

7. In a change-valve mechanism for compound meters, cylinder 12 having low duty ports 1 and 2 and high duty port 7, piston valve I controlling said ports and controlled by fluid pressure, there being an annular passage 4 in said piston valve connecting with low duty port 1, a central passage 6 in said piston valve open at its upper end, and a side passage 5 connecting said annular and central passages, and central plunger 16, having passage 8 therein, positioned to enter said central passage 6 to form a dash pot.

8. In a change valve mechanism for compound meters, a cylinder having a low duty port and a high duty port, a piston valve in said cylinder controlled by the fluid pressure, there being an annular passage in said piston valve connected with said low duty port, a central passage in said piston valve, and a side passage connecting said annular and central passages, a spider carried by said cylinder for limiting the upward movement of said piston valve and a central plunger carried by said spider arranged to enter said central passage and forming with the central passage, a dash pot acting to retard the piston valve and prevent shock on shifting the valve to change from low duty to high duty operation.

9. In a change valve mechanism for compound meters, a cylinder having a low duty port and a high duty port, a piston valve controlling said ports and controlled by fluid pressure, and a dash pot acting to retard the piston valve before the low duty port is closed on shifting from low duty to high duty registration.

10. In a change valve mechanism for compound meters, a piston valve having one end exposed to the fluid pressure tending to move the piston valve for change from low duty to high duty, and having a passage within the piston valve closed to said end and forming the inlet to the low duty meter, the areas of said piston valve end and passage being arranged to secure a quick throw of the valve on change from low duty to high duty.

11. In a change valve mechanism for compound meters, a piston valve having one end exposed to the fluid pressure tending to move the piston valve for change from low duty to high duty, and having a passage within the piston valve closed to said end and forming the inlet to the low duty meter, the areas of said piston valve end and passage being arranged to secure a quick throw of the valve on change from low duty to high duty, and a plunger adapted to enter and close said passage on change from low duty to high duty and open said passage before the close of the valve movement on change from high duty to low duty.

12. In a change valve mechanism for compound meters, cylinder 12 having low duty port 1 and high duty port 7, piston valve I controlling said ports and controlled by fluid pressure, there being an annular passage 4 in said piston valve controlling said low duty port 1, a central passage 6 in said piston valve open at its upper end, and a side passage 5 connecting said annular and central passages.

13. In a change valve mechanism for compound meters, cylinder 12 having low duty port 1 and high duty port 7, piston valve I controlling said ports and controlled by fluid pressure, there being an annular passage 4 in said piston valve coöperating with low duty port 1, a central passage 6 in said piston valve open at its upper end, and a side passage 5 connecting said annular and central passages, and central plunger 16 having passage 8 and positioned to enter said central passage 6.

In testimony whereof we have hereunto set our hands in the presence of two subscribing witnesses.

CARL GEORGE DE LAVAL.
ROLAND HEIMBECKER.

Witnesses:
 EDNA MOSER,
 H. W. POST.

Copies of this patent may be obtained for five cents each, by addressing the "Commissioner of Patents, Washington, D. C."